Oct. 14, 1924.                                                              1,511,574
E. H. MORTSELL
INDICATING AND RECORDING INSTRUMENT
Filed May 24, 1920                       7 Sheets-Sheet 1
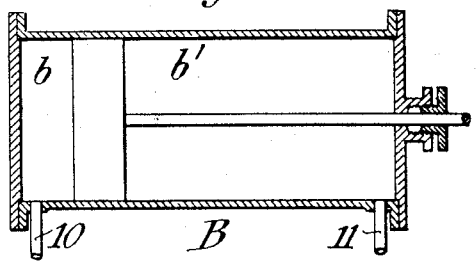
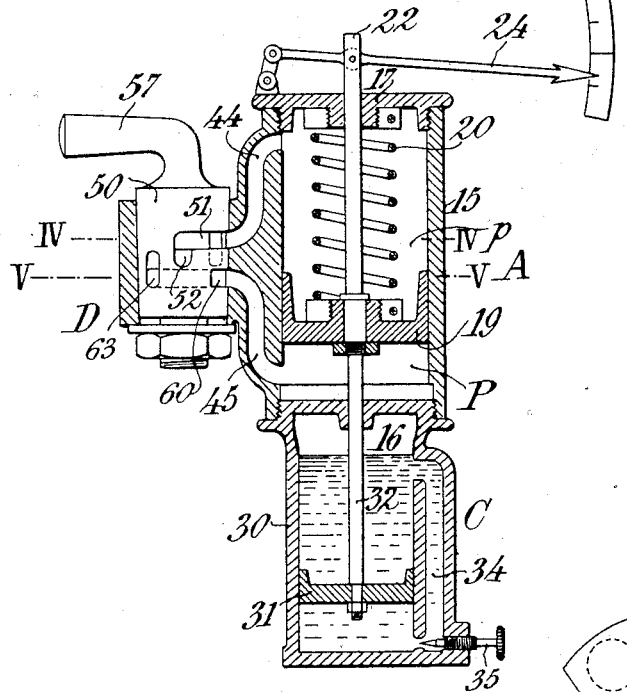
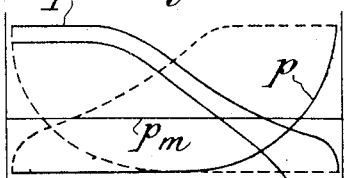
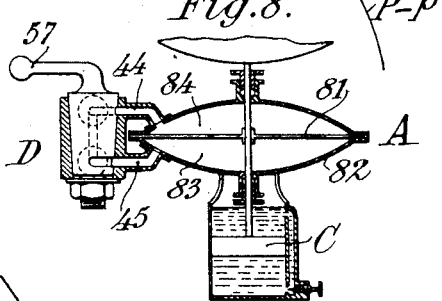
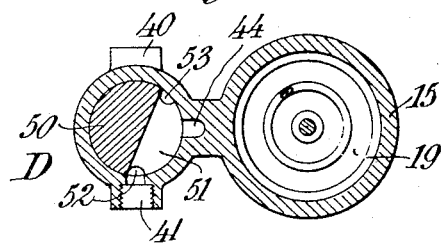
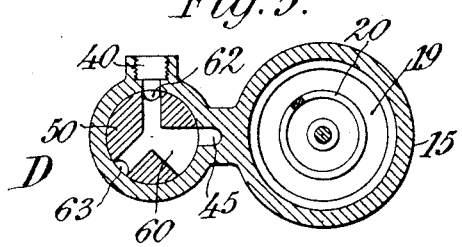
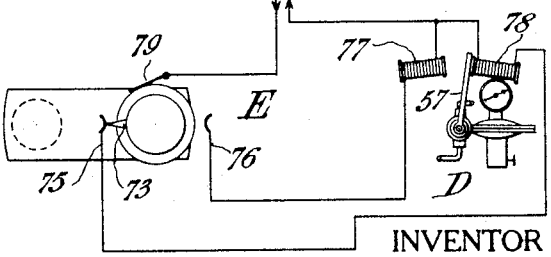
INVENTOR
Edvin Harald Mortsell
By Attorneys,
Fraser Turk & Myers Oct. 14, 1924.
E. H. MORTSELL
INDICATING AND RECORDING INSTRUMENT
Filed May 24, 1920      7 Sheets-Sheet 2
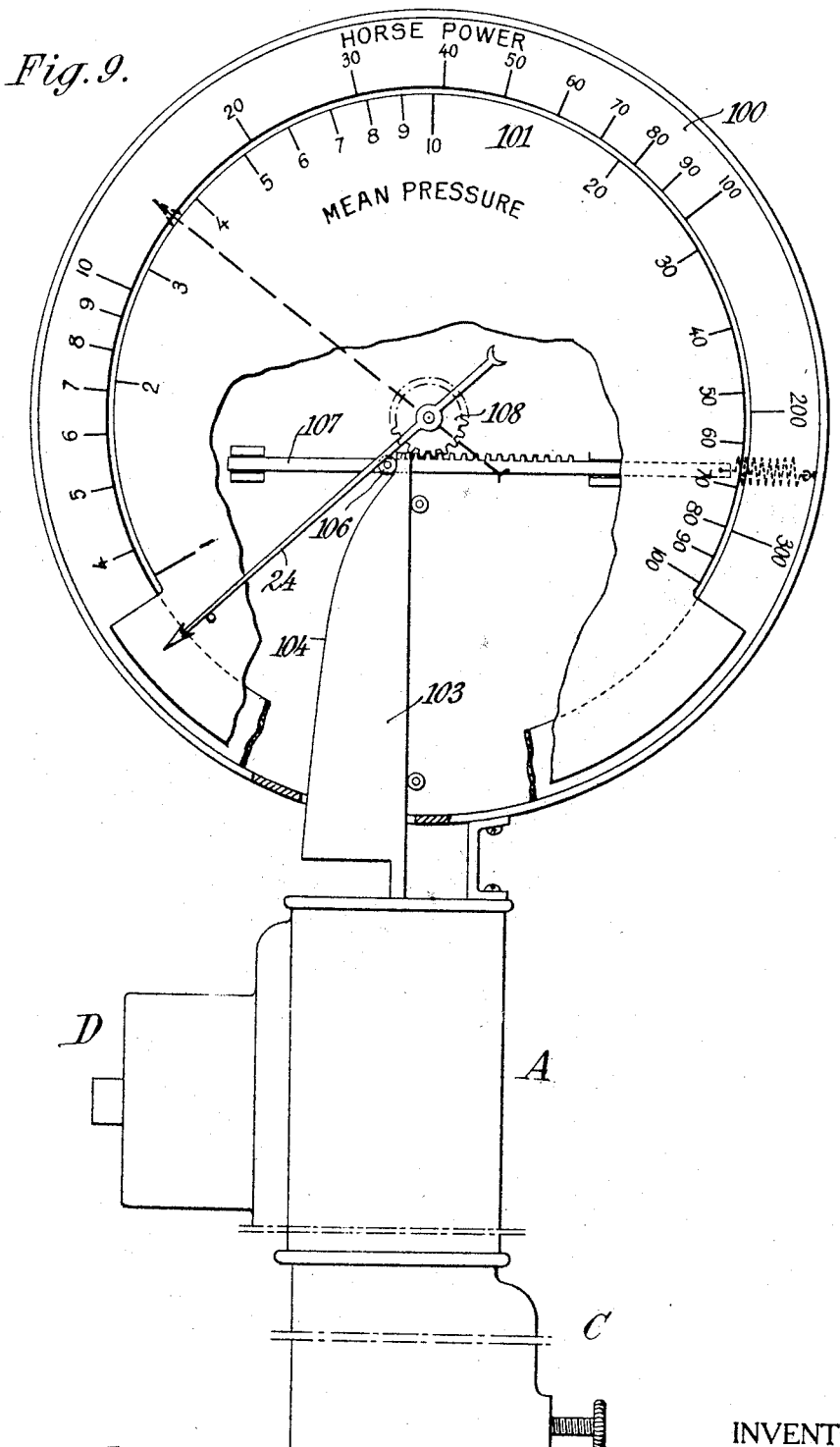
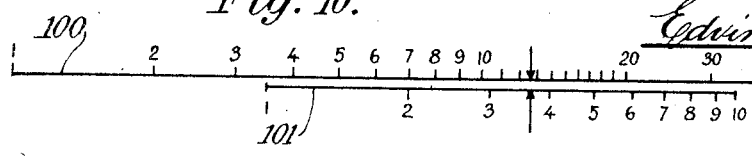
INVENTOR:
Edwin Harald Mortsell
By Attorneys,
Fraser, Turk & Myers Oct. 14, 1924.
E. H. MORTSELL
1,511,574
INDICATING AND RECORDING INSTRUMENT
Filed May 24, 1920  7 Sheets-Sheet 3
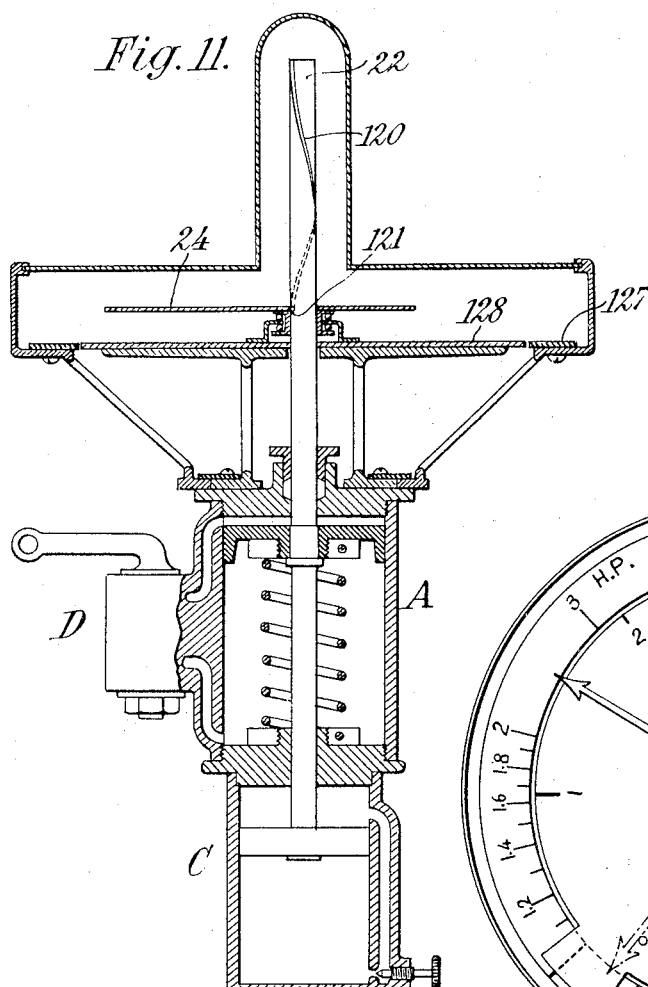
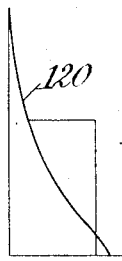
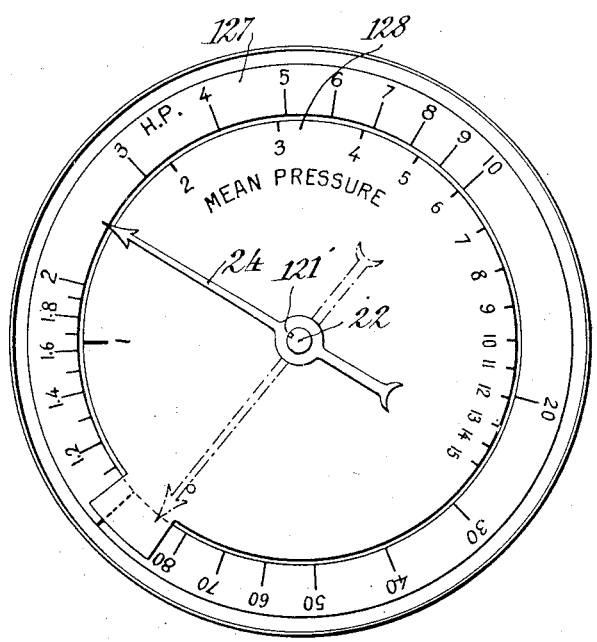
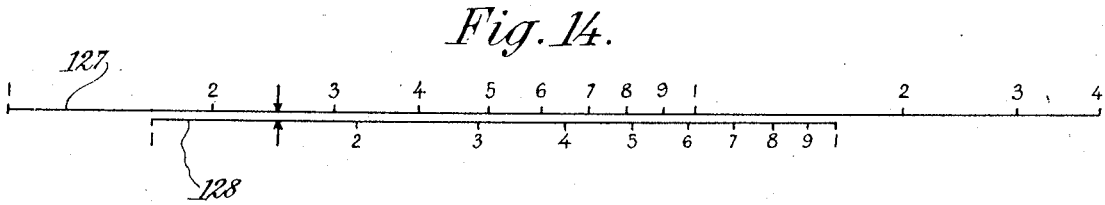
INVENTOR:
Edvin Harald Mortsell
By Attorneys,
Fraser, Turk & Myers Oct. 14, 1924.  1,511,574
E. H. MORTSELL
INDICATING AND RECORDING INSTRUMENT
Filed May 24, 1920    7 Sheets-Sheet 4
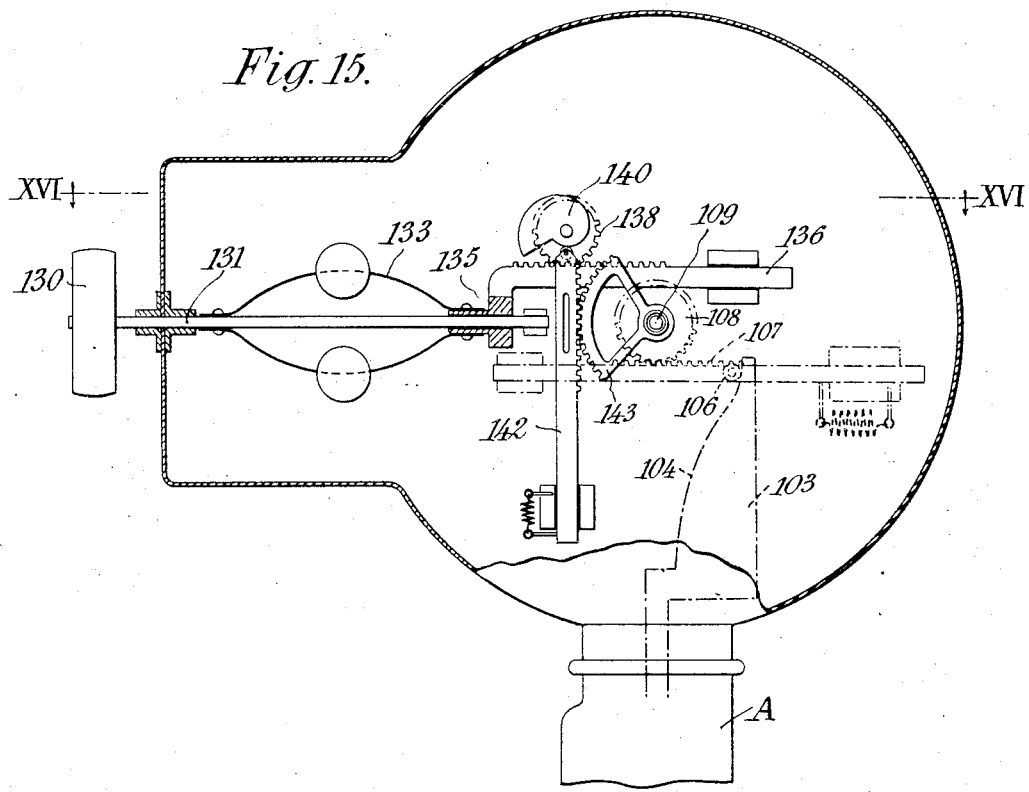
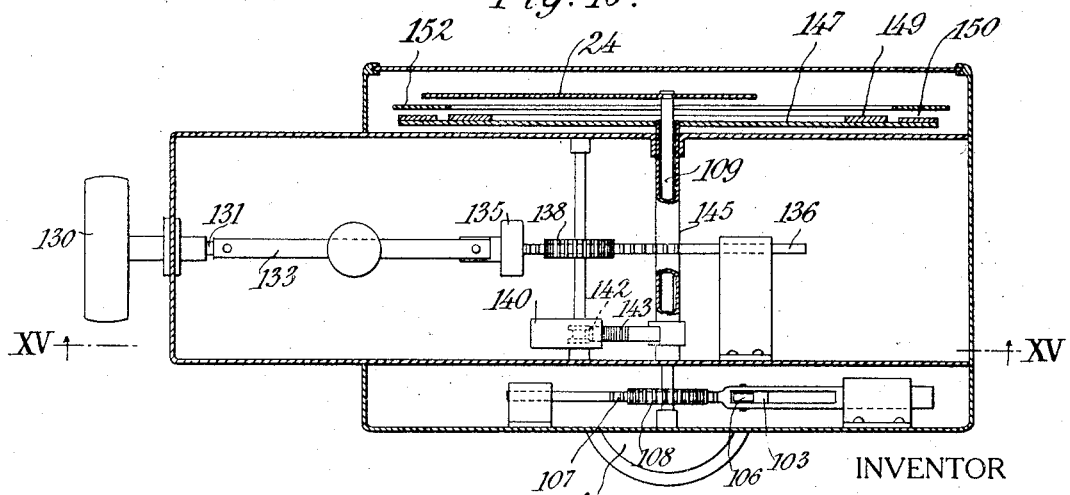
INVENTOR
Edwin Harald Mortsell
By Attorneys,
Fraser Turk Myers Oct. 14, 1924.
E. H. MORTSELL
1,511,574
INDICATING AND RECORDING INSTRUMENT
Filed May 24, 1920    7 Sheets-Sheet 5
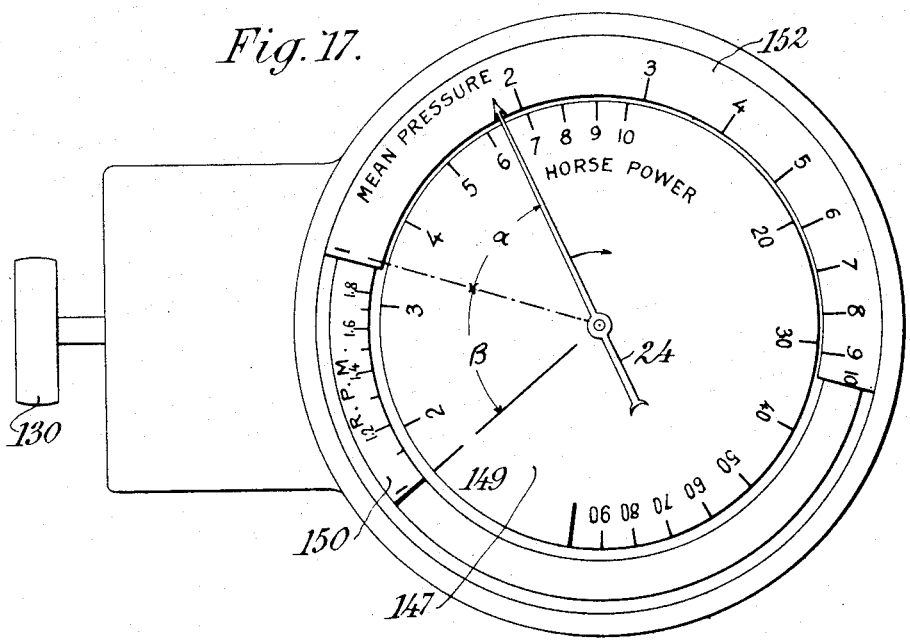
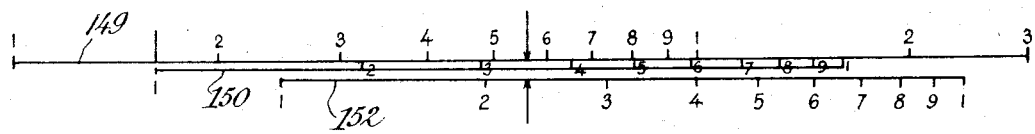
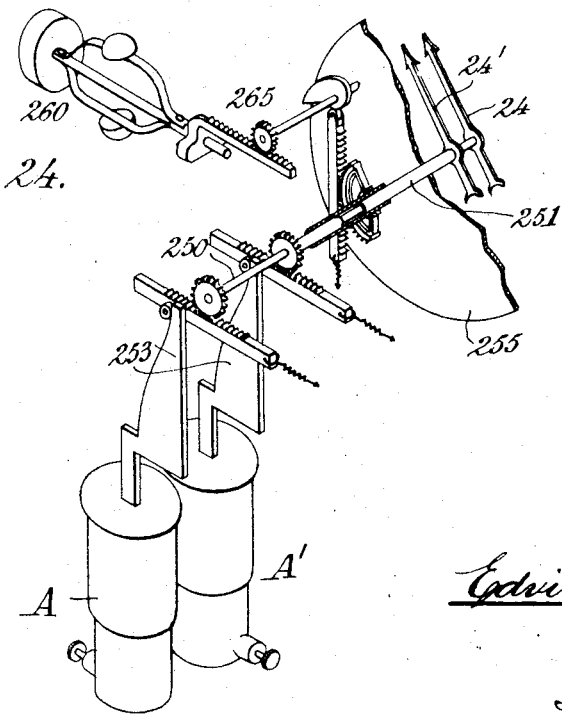
INVENTOR:
Edvin Harald Mortsell
By Attorneys,
Fraser Turk & Myers Oct. 14, 1924.
E. H. MORTSELL
1,511,574
INDICATING AND RECORDING INSTRUMENT
Filed May 24, 1920     7 Sheets-Sheet 6
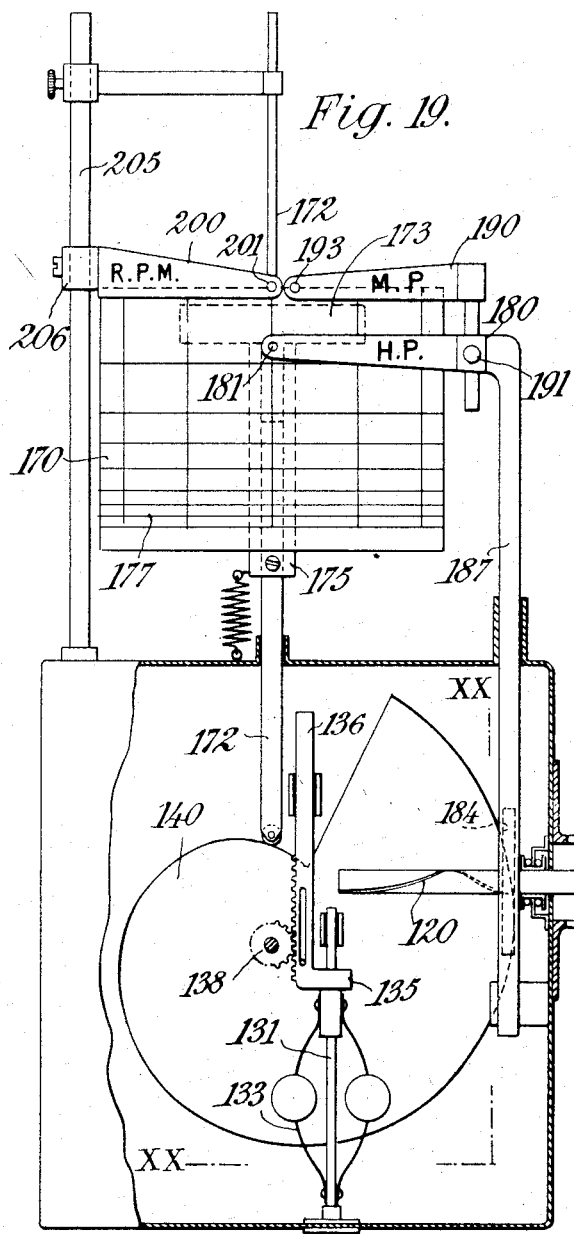
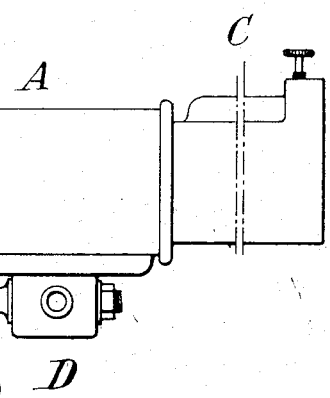
INVENTOR:
Edwin Harald Mortsell
By Attorneys,
Fraser, Turk & Myers INVENTOR:
Edwin Harald Mortsell
By Attorneys,
Fraser, Turk & Myers Patented Oct. 14, 1924.

1,511,574

UNITED STATES PATENT OFFICE.

EDVIN HARALD MORTSELL, OF STOCKHOLM, SWEDEN.

INDICATING AND RECORDING INSTRUMENT.

Application filed May 24, 1920. Serial No. 383,819.

*To all whom it may concern:*

Be it known that I, EDVIN HARALD MORTSELL, a subject of the King of Sweden, residing in the city of Stockholm, in the Kingdom of Sweden, have invented certain new and useful Improvements in Indicating and Recording Instruments, of which the following is a specification.

This invention relates to indicating and recording instruments for reciprocating engines and pumps and aims to provide improvements therein.

The invention provides an instrument by means of which a direct reading or indication of the mean-pressure in the cylinder or cylinders of an engine or pump may be obtained.

The invention further provides an instrument which will give a direct indication or reading of the horsepower of a pump or engine, or the indicated horsepower, and which preferably is adapted for use upon constant speed, as well as variable speed engines and pumps; and which furthermore may provide an indication of the number of revolutions of the engine or pump.

The invention further provides an instrument capable of general use, as for example, upon engines of different stroke and diameter of piston, and giving direct readings of mean pressure, horsepower, and number of revolutions (either one, several or all).

The invention further provides instruments which may be applied to engines or pumps having single or double acting pistons.

The invention further provides an instrument or instruments of the character indicated, which will record the indications of mean pressure revolutions per minute and horsepower (either one, several or all).

The invention further provides an instrument which shows the relation of horsepower developed at any particular time, to an ideal or standard of horsepower for such indicated speed.

The invention further provides an instrument or instruments of the character described, capable of use with multiple expansion engines.

The invention further provides novel combinations and sub-combinations, hereinafter more fully set forth.

Several embodiments of the invention are illustrated in the accompanying drawings.

In said drawings,—

Figure 1 is a conventional sectional view of a cylinder having a double acting piston therein.

Fig. 2 is a diagram comprising pressure curves graphically illustrating the pressures in a double acting steam engine.

Fig. 3 is a view, mainly in section, of one embodiment of the invention.

Figs. 4 and 5 are cross-sectional views, on the lines 4—4, 5—5 respectively, Fig. 3.

Figs. 6 and 7 illustrate two embodiments of mechanism for shifting the valve shown in Fig. 3.

Fig. 8 is a view, similar to Fig. 3, of a second embodiment of the invention.

Fig. 9 is a view, partly in section, and partly in elevation, of a third embodiment of the invention.

Fig. 10 is a view of the logarithmic scales shown in Fig. 9, laid out in a line.

Fig. 11 is a sectional view of a fourth embodiment of the invention.

Fig. 12 is a top plan view of the construction shown in Fig. 11.

Fig. 13 is a development of the cam groove on the piston rod shown in Fig. 11.

Fig. 14 is a view of the two logarithmic scales shown in Fig. 12, laid out in a line.

Figs. 15, 16, 17 and 18 are views of a fifth embodiment of the invention; Fig. 15 is a sectional view on the line XV—XV, Fig. 16; Fig. 16 is a sectional view on the line XVI—XVI, Fig. 15; Fig. 17 is a view in elevation of the construction shown in Figs. 15 and 16; and Fig. 18 is a view of the three logarithmic scales shown in Fig. 17, laid out in a line.

Figs. 19, 20 and 21 are views of a sixth embodiment of the invention; Fig. 19 is a view, principally in section, of said embodiment; Fig. 20 is a sectional view on the line XX—XX, Fig. 19; Fig. 21 is a view illustrating the logarithmic relation of the indicating parts.

Figure 22:
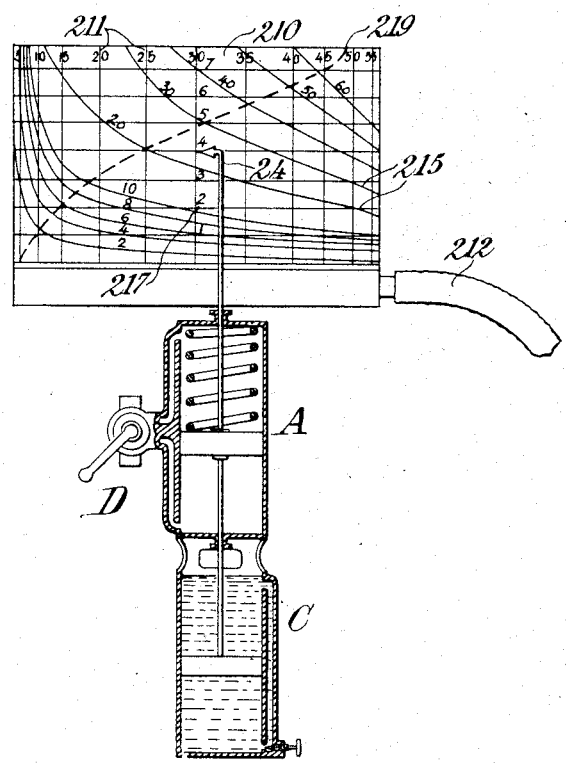
Figure 23:
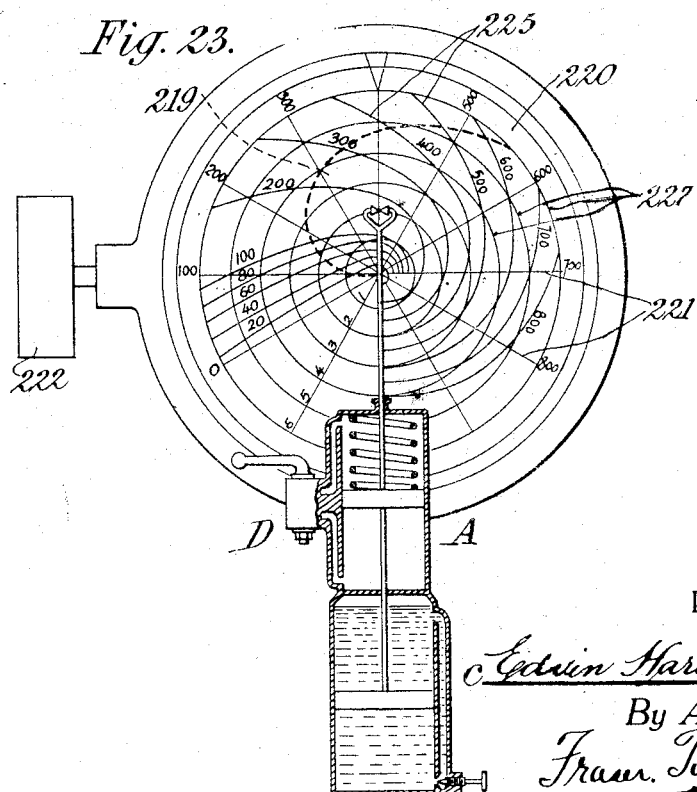

Figs. 22 and 23 are views of a seventh and eighth embodiment of the invention.

Fig. 24 is a view of a ninth embodiment of the invention suitable for use upon a multiple expansion engine.

Referring to said drawings, there is shown in the embodiment illustrated in Fig. 3, a pressure responsive element A, of any suitable construction, adapted to communicate with an engine or pump cylinder, on two sides of the piston. The cylinder may be that of a single or double acting engine or pump, and may be a part of a steam or internal combustion engine, or the like. In Fig. 1, there is conventionally shown the cylinder of a steam engine having a double acting piston therein, and the pressure responsive device A of the indicating and recording device of the present invention may be considered as connected to the two ends of said cylinder via the conduits 10 and 11.

The pressure responsive element may conveniently comprise a cylinder 15, closed at its ends by the heads 16 and 17, having a piston 19 therein, the movement of which is resisted by the spring 20. The piston 19 may have a rod 22 which extends through one end of the cylinder, and which is preferably connected to an indicating mechanism or part, as for example a hand 24.

The piston 19 is preferably provided with or connected to a device or means for damping its movement, as for example to a dashpot C. The dashpot C conveniently comprises a cylinder 30 containing a piston 31 therein, which piston is conveniently connected to the piston 19 by an extension 32 on the piston rod 22. 34 designates a by-pass channel between the ends of the dashpot and 35 designates a needle valve for graduating the opening through the by-pass.

The pressures on the two sides of the piston in the cylinder B of the engine or pump to be indicated are communicated to the two sides of the pressure responsive element A, that is, in the embodiment of Fig. 3, to the two ends of the cylinder 15, through a reversing valve D of any suitable construction. The reversing valve may comprise ports 40, 41, connected with the conduits 10, 11 respectively of the engine cylinder B.

In the case of an engine with a single acting piston, one of the ports 40, 41 of the pressure responsive device A may be placed in communication with the atmosphere, so that one side of the pressure responsive device may be under a similar condition of pressure to the inactive side of the engine piston. The pressure responsive device has passages 44, 45 leading from the two ends of the cylinder to the valve. The valve proper 50 may be provided with a cross channel 51 adapted to continuously communicate with the passage 44 and communicating with longitudinal channels 52, 53, which channels 52, 53 are adapted to alternately communicate with the ports 40, 41. The valve 50 is also provided with a cross channel 60 (with several branches) adapted to continuously communicate with the channel 45, and having longitudinal passages 62, 63, adapted to alternately communicate with the ports 40, 41. The arrangement of the channels 51 and 60 and their associated ports, is such that the side P of the pressure responsive device, in one position of the valve, is connected with one side $b$ of the piston in the engine cylinder B, and, in the same position of the valve, the other side $b'$ of the piston in the engine cylinder is connected with the side $p$ of the pressure responsive device. When the valve 50 is turned to reverse the connections with the engine cylinder, the sides P and $p$ of the pressure responsive device are connected to the sides $b'$ and $b$ respectively of the engine cylinder. That is, the side P of the pressure responsive device (with a double acting steam engine) is connected at each stroke of the engine piston (by the reversing action of the valve 50), with the pressure side of the engine piston or cylinder, and the side $p$ of the pressure responsive device is connected with the exhaust, (or atmospheric side of the engine piston or cylinder). With a single acting engine (working on two cycles or four cycles) the reversal would be carried out, as with the double acting (one cycle) steam engine.

Any suitable connections E may be provided for reversing the valve D. As shown in Fig. 6, the connections E comprise a rod 70 adapted to be moved by a cam 71 upon the crank shaft, or a timed cam shaft, of the engine. The rod 70 acts to move the arm 57 of the valve D to one of its positions, and the spring 58 acts to effect the return movement (corresponding with the reversed position of the valve). The spring 58 also acts through the arm 57 to keep the rods 70 in contact with the cam 71.

An electrical means for shifting the valve D is shown in Fig. 7. 73 designates a contact-piece on the crank shaft or timed cam shaft of the engine. The contact piece 73 makes contact alternately with the brushes 75, 76 and admits current to one or other of the electromagnets 77, 78, which act to pull the arm 57 of the valve D, to first one, then the other of its admission positions. One side of the circuit may be grounded upon the crank shaft by means of a conductor and brush 79.

A second embodiment of the invention is illustrated in Fig. 8. Instead of a piston there may be used a flexible diaphragm 81 enclosed in a casing 82, having chambers 83, 84, on each side thereof. The two sides of the engine piston are connected with the chambers 83, 84, via the ducts 44, 45, through the valve D. The valve D is a reversing valve similar to that shown in Figs. 3, 4, 5. The action thereof is to connect the working side or pressure side of the engine piston with one and the same side of the pressure responsive device, as for example with the chamber 83, as set forth above more fully in connection with the description of the embodiment shown in Fig. 3. The pressure responsive device is preferably connected with a dashpot or other damping means C.

The valve D may be shifted by means such as shown in Figs. 6 and 7, as described above.

The indicating means may comprise a simple hand moving at 24, Fig. 3, moving over a simple scale 90. With a spiral spring, such as indicated in Fig. 3, the movement of the spring upon increases or decreases of pressure, will be proportional to the pressure. The scale 90 could, therefore, be calibrated in equal parts, each corresponding to a unit of pressure. With a diaphragm, such as shown in Fig. 8, the movement is not uniform or proportional to the pressure, and hence it is necessary, in calibrating the scale, to take into account the variation of the degrees of movement of the diaphragm under equal increments of pressure.

Moreover, such a device as shown in Figs. 3 and 8 may, in connection with any particular engine or pump running at a constant speed or number of revolutions of its crank shaft, be calibrated to indicate horse power.

The indicated horse power (metric) of a double acting steam engine, at constant speed, is represented by the formula $$\frac{p_m \cdot \pi \cdot d^2 \cdot L \cdot 2 \cdot n}{4 \cdot 75 \cdot 60},$$

and the diameter of the piston, length of stroke and number of revolutions being ascertained, all of the factors with the exception of the mean pressure, may be represented by a constant, as follows:

$$c = \frac{\pi \cdot d^2 \cdot L \cdot 2 \cdot n}{4 \cdot 75 \cdot 60}.$$

Therefore, indicated horse power equals $p_m \cdot c$. With a variable speed engine the indicated horse power becomes $p_m \cdot c_1 n$ in which $$c_1 = \frac{\pi \cdot d^2 \cdot L \cdot 2}{4 \cdot 75 \cdot 60}.$$

With the scale, therefore, calibrated in horse power for a particular engine, the indicating device could not be used upon another different engine or pump without recalibrating the scale, in accordance with the different factors entering into the constant. It is desirable to have the indicating device applicable to any engine or pump to indicate horse power, without requiring any special calibration for the particular engine on which it is used. The indicating device could therefore be made and sold as a stock article capable of being sold for use, without change.

In order to accomplish this purpose, the scale is made as a logarithmic scale 100 (Figs. 9 and 10), and a second logarithmic scale 101 (having a spacing corresponding to the first) is preferably provided. These scales have the relation of two logarithmic scales on an ordinary slide rule. The indicating pointer or hand 24 is also so connected with the pressure-responsive means that for equal increases of pressure its movement varies in accordance with logarithmic progression. In the construction shown in Fig. 9 the pressure-responsive arrangement may be similar to that shown in Fig. 3, and the piston is conveniently connected to the indicator hand 24 through a plate 103 having a cam 104 having a logarithmic curve, which cam 104 is adapted to contact with a roller 106 on a rack 107 meshing with a pinion 108 upon which the hand 104 is fixed. With a diaphragm such as shown in Fig. 8, the cam 104 would be modified to take into account the irregular movement of said diaphragm.

In applying the indicating device to a constant speed engine or pump, its constant composed of the known factors, to wit, the area of piston $$\frac{(\pi d^2)}{4},$$

length of stroke (L) and number of strokes per second $\frac{2n}{60}$ and equivalent of H. P. (75 kgm. per second) is first ascertained by calculation. The scale 101 will be used as a setting scale, and will occupy a normally fixed position. The reading scale 100, which will indicate the horse power, is moved around with reference to the setting scale until the number thereon corresponding to the calculated value of the constant of the engine or pump is opposite the numeral 1 on the setting scale. When the indicator hand 24 is actuated by the pressure responsive device, in response to pressure upon it transmitted from the engine or pump, the number on the reading scale 100 opposite which the hand 24 stands (as, for example, the dotted line position of the hand) will have added thereto the quantity of the constant, and hence the indications on the reading scale 100 will contain the logarithmic sum of both the constant and the mean pressure, which will also be the product of the constant multiplied by the mean pressure.

The setting scale 101 may also be used to indicate mean pressure.

A fourth embodiment of the invention is illustrated in Figs. 11 to 14, inclusive. This embodiment is similar to that shown in Fig. 9, and can be applied to any constant speed engine.

The pressure-responsive device A, and the dash-pot C, and the valve mechanism D, may be similar to that shown in Fig. 3. The piston rod 22, however, may be provided with a cam groove 120 having logarithmic form, a development of which is shown in Fig. 13. This groove 120 may be directly engaged by a finger or lug 121 on the indicating hand 24. By this arrangement the movements of the pressure-responsive device A impart a logarithmic movement to the hand 24. The device may also be provided with two scales 127, 128, corresponding to the scales 100 and 101 of the embodiment shown in Fig. 9. The scale 128 may be used as a setting scale, and may also be utilized as a scale for indicating the mean pressure. The scale 127 may be used as a reading scale, and indicates horse power. In attaching the indicator to an engine or pump, the constant is first calculated from the known factors, and the reading scale set with reference to the setting scale, so that number 1 on the setting scale is opposite the number representing the constant on the reading scale. Any indication on the reading scale 127 will therefore include within it the logarithmic sum of the mean pressure and the constant, and hence will represent the product of the constant and the mean pressure, thereby directly indicating the horse power.

The invention is also preferably adapted to be applicable to variable speed engines or pumps. An embodiment of the invention having this capability is illustrated in Figs. 15 to 18. In said embodiment the pressure-responsive device A may be similar to that shown in Fig. 3. The transmission between the pressure-responsive piston and the indicating hand 24 may be the same as that shown in Fig. 9, and comprise a plate 103 having a cam surface 104 having a logarithmic outline. The cam 104 actuates the rack 107 and pinion 108 (by contact with the roller 106), shown somewhat more clearly in Fig. 9.

The hand 24 is carried by a shaft 109 to which the pinion 108 is fixed.

For measuring the speed or number of revolutions, a suitable form of speed responsive mechanism, (commonly known as speedometers, tachometers, revolution counters or the like) may be used. In the form of speed responsive mechanism here shown, numeral 130 designates a pulley or the like adapted to be connected to the drive shaft or the like of the engine or pump, the horse power of which is to be indicated. The pulley 130 is mounted upon a shaft 131 having thereon a number of centrifugally weighted springs 133 attached at one end to a collar 135 connected with a slidable rack 136, which rack is adapted to be moved back and forth, through the connection 135, by the centrifugally weighted springs 133. The rack 136 meshes with the pinion 138, which pinion has connected thereto a cam 140. Where the movement of the rack 136 is not strictly proportional to the speed or number of revolutions of the shaft 131, as in the embodiment shown, and it is desired to impart a logarithmic movement to the indicating part actuated by the centrifugal device, cam 140 is given such a contour that the movement of the rack 136, together with the movement imparted by the cam 140 to a rack 142, together impart a logarithmic movement to said rack 142. The rack 142 meshes with a segment 143 which is fixed to a sleeve 145 preferably concentric with the shaft 109. The sleeve has fixed thereto a disk or pulley 147. The disk 147 preferably carries thereon two logarithmic scales 149, 150. The scale 150 may be used as a scale for measuring the revolutions per minute, and also serves as a setting scale for the reading scale 149. When the indicator is applied to a pump or engine, the constant representing the value of its known factors, as ascertained by calculation, and described above, the scale 149 is moved with reference to the scale 150 so that the number on the scale 149 corresponding to the constant, is opposite the number 1 mark on the scale 150. The scales 149, 150, thereafter retain this fixed relation upon the disk 147. A separate scale 152 may be provided. In the idle position of the parts, the number 1 marks on the scales 150 and 152 normally lie close together. When the engine or pump is working, the indicating hand 24 will be moved (by the pressure responsive device), to indicate the mean pressure of the engine or pump, and the disk 147 will be rotated (by the speed indicating mechanism driven by the pulley 130), and the scale 150 will indicate revolutions per minute. It will be noted that the disk 147 and the hand 24 move away from one another, or in opposite directions, hence the total amount of movement will be the sum of the movements of the hand 24 and of the disk 147, represented in Fig. 17 by the angles $\alpha$ and $b$. As the value of the constant has been added to the movement of the scale, in the setting of the scale 149 on the disk 147, the movement of the disk 147 represents the product of the constant and the revolutions per minute, and adding to this the movement of the hand 24 relatively to the scale 149, the number on the scale 149 opposite the hand represents the product of the mean pressure, speed (or number of revolutions) and constant. The relative positions of the hand and scales shown in full lines in Fig. 7 is represented as laid out in a straight line in Fig. 18.

The invention may also comprise means for recording, or indicating and recording the mean pressure, revolutions per minute, and horse power of an engine or pump (one, several or all). Such an embodiment of means is illustrated in Figs. 19 to 21 inclusive.

In Fig. 19 numeral 170 designates a drum mounted upon a staff or shaft 172, and rotated thereon by means of a clock-work 173. The position of the drum on the staff 172 may be adjusted by means of a collar 175. The drum is provided with a record sheet 177 preferably ruled with lines spaced in logarithmic progression. Numeral 180 designates a pointer or indicator having a stylus or pen 181 thereon adapted to bear against the recording sheet 177. The indicator 180 is connected to a pressure responsive part A like that shown in Fig. 3. The transmission device may be similar to that shown in Figs. 11 and 12 and may comprise a rod 22 having a cam groove 120, having a logarithmic form, this groove 120 engaging a lug or projection 121 on a gear 184 meshing with a rack 185 formed upon or attached to a rod 187 carrying the pointer or hand 180.

For indicating and recording horse power upon a constant speed engine or pump, the value of the constant representing the known factors of the engine or pump may be ascertained by calculation, as explained above. The drum 170 may be moved upon the staff 172 to an extent corresponding with the value of this constant. When the pointer or hand 180 is moved by the pressure responsive device A, the position with reference to the lines on the recording sheet, and the line drawn thereon by the stylus 181, will represent the horse power of the engine, inasmuch as the position of the hand 180 will be opposite a numeral which is the logarithmic sum of the constant and mean pressure, which corresponds with the product of the constant and mean pressure. The mean pressure could be ascertained from the record sheets by subtracting the value of the constant. Preferably, however, a separate record and indication of the mean pressure is obtained by means of a pointer or hand 190 which is adjustably carried by the rod 187 which carries the pointer 180 as indicated at 191. By means of the adjustable connection 191, the pointers 180 and 190 may be separated from one another by distance representing the value of the constant.

It is further preferable to have the device applicable to variable speed engines or pumps. To this end, the device may include a speed responsive means, similar to that in Figs. 15 and 16, and may comprise the pulley 130 adapted to be connected with the drive shaft of the engine or pump. The pulley 130 drives a shaft 131 having centrifugally weighted springs 133 thereon. These springs are attached to a collar 135 which, under the action of centrifugal force on the springs 133 slide a rack 136 back and forth. The movement imparted to the rack by the springs 133 combined with the contour of the cam 140 (connected to the rack 136 through a pinion 138) imparts a logarithmic movement to the staff 172 carrying the drum 170. When the engine or pump is working, the staff 172 carrying the drum 170 will be slid upwardly, and in an opposite direction to the movement of the pointer 180 attached to the pressure responsive device A. The movement of the pointer 180 will be in a direction opposite to that of the staff 172 carrying the drum 170; consequently the two movements will be added together and the sum of the movements will be the logarithmic sum of the two motions, corresponding to the product of the revolutions per minute, mean pressure and the constant. In order to record and indicate the revolutions per minute, a pointer 200 may be provided, and this pointer may be provided with a stylus or pen 201. The pointer 200 may be fixed upon a rod 205, and the positions of the indicator may be adjusted by means of the set screw collar 206. In setting the drum 170 to correspond with the constant, the pointer 200 is correspondingly moved, so that the record and indications will start at the initial point on the scale 177. The relation of the pointers to the logarithmic scale is indicated diagrammatically in Fig. 21.

The seventh and eighth embodiments of the invention are illustrated in Figs. 22 and 23.

In these embodiments the pressure-responsive device, its adjuncts, and connection and mode of operation, in conjunction with an engine cylinder, is similar to that shown in, and described with reference to, Fig. 3. In Fig. 22, 210 designates a drum which is rotated by any suitable speed-responsive mechanism, a part of which, 212, is shown in the drawing. The drum 210 is conveniently graduated circumferentially in equal divisions, as indicated at 211 (where as is here the case the movement is proportional to the increases of speed). As here shown, the pressure-responsive device which indicates mean pressure, moves in proportion to increases and decreases of pressure, and hence the drum 210 may be graduated vertically in equal divisions to denote values of mean pressure, as indicated at 217. The drum is also provided with lines 215 indicating horse power, points in each line sufficient to determine its form being ascertained by calculation. Each line indicates the product of the constant, a given mean pressure, and a given speed or number of revolutions. For example, in Fig. 22, at a speed of 30 miles per hour, and a mean pressure of value 34, the horse power would be 20. The hand 24, (Fig. 22) being between the 20 and 30 horse power lines, indicates that the horse power is above 20 and below 30, to wit, somewhat less than 24 horse power.

The drum 210 may also be provided with a line 219, which represents the most efficient horse power at different speeds at which the engine will operate. By noting the approximation of the indicator hand 24 to the efficiency line 219, and suitably controlling the operation of the engine, the engine may be operated under its most efficient conditions. For instance, with an automobile ascending a hill, if the speed be 30 miles an hour, and the pressure responsive device indicates a value of 60 for the mean pressure, the efficiency line 219 will show that the engine is not being worked at its condition of greatest efficiency. It would therefore be advisable to go up the hill more slowly, and the force supplied to the engine could be cut down until the speed and mean pressure both dropped to an extent where the indicator hand 24 would be opposite a point where the efficiency line crossed the speed line.

In Fig. 23 the part carrying the scale is in the form of a disk 220. It is actuated by any suitable speed-responsive mechanism, part of which is indicated at 222. The disk 220 is provided with lines 221 corresponding to different values of speed, and with lines 227 corresponding to different values of mean pressure. It is also provided with a plurality of horse power curves 225 derived in a manner similar to the lines 215 in Fig. 22. The disk may also be provided with an efficiency line 229 similar to the line 219 in the preceding figure. The operation of the device in Fig. 23 is similar to that shown in Fig. 22.

In Fig. 24 is shown an embodiment of the invention suitable for use upon a compound engine. Each of the cylinders of the compound engine could be connected with pressure-responsive devices A A' similar to the pressure-responsive device shown in Fig. 3. These pressure-responsive devices A A' would indicate the mean pressure in each of the cylinders. The mean pressures are preferably transmitted to indicating hands 24, 24', and in order that the device may be suitable for general use, the movement of the pressure-responsive device is preferably transformed to a logarithmic movement by mechanisms 253 similar to that shown in the preceding figures, notably Fig. 9. The hands 24, 24' are conveniently carried upon concentric shafts 250, 251, so that the hands have a common center of movement. 255 indicates a scale, suitably calibrated, over which the hands 24, 24' move. The scale 225 is logarithmic, where the movement of the indicating parts is logarithmic. The construction may also be adapted for variable speed engines or pumps. A speed-responsive device 260, of any suitable construction, but conveniently similar to that shown in Figs. 19 and 20, may be employed, and the speed-responsive device is connected to the scale 225 in such manner as to move it, and to move it in an opposite direction to the movement of the hands 24, 24'. Where the indicating hands 24, 24' move logarithmically, the scale 225 is also moved logarithmically, as by means of mechanism 265 similar to that shown in Figs. 19 and 20. The hands 24, 24' will each indicate the horse power of the compound cylinder of the engine in conjunction with which it works. By adding these values, the total horse power developed by the compound engine may be ascertained. When the diameter (or other factor) of the several cylinders differ, compensation must be made for the variation. This can be done by providing separate graduations on the dial or changing the loading spring on one of the pressure responsive devices, or by varying the relation of the piston of the pressure responsive devices to the engine pistons, and otherwise. The device could also be made to record the horse power and other values by making appropriate modifications of the device.

The invention is not to be understood as limited to any of the specific embodiments shown. The inventive ideas herein set forth may receive a variety of mechanical expressions.

What is claimed is:

1. An indicator for reciprocating engines or pumps, comprising a pressure responsive device, and means for communicating the pressures on each side of the engine piston to opposing sides of said pressure responsive device, whereby said pressure responsive device may assume a position corresponding to the difference in pressure on the two sides of the engine piston, means for damping the movement of said pressure responsive device, means for reversing the communication between the opposing sides of said pressure responsive device and the two sides of the engine piston, indicating means, and means for causing said pressure responsive device to logarithmically actuate said indicating means.

2. An indicator for recipocating engines or pumps, comprising a pressure responsive device and means for communicating the pressures on each side of the engine piston to opposing sides of said pressure responsive device, whereby the said pressure responsive device may assume a position corresponding to the difference in pressure on the two sides of the engine piston, means for reversing the communication between the opposing sides of the pressure-responsive device and the two sides of the engine piston on each stroke of said engine piston, indicating means, means for causing said pressure responsive device to logarithmically actuate said indicating device, and a logarithmically calibrated scale in conjunction with said indicator.

3. An indicator for reciprocating engines or pumps, comprising a pressure responsive device and means for communicating the pressures on each side of the engine piston to opposing sides of said pressure responsive device, whereby the said pressure responsive device may assume a position corresponding to the difference in pressure on the two sides of the engine piston, means for reversing the communication between the opposing sides of the pressure responsive device and the two sides of the engine piston on each stroke of said engine piston, indicating means, means for causing said pressure responsive device to logarithmically actuate said indicating device, and two logarithmically calibrated scales, one of which is displaceable with relation to the other, whereby the reading scale may be displaced with relation to the other scale to an extent corresponding with the value of a constant which it is desired to include in the value of the number indicated by the indicator.

4. An indicator for reciprocating engines or pumps comprising a pressure responsive device and means for communicating the pressures on each side of the engine piston to opposing sides of said pressure responsive device, whereby said pressure responsive device may assume a position corresponding to the difference in pressure on the two sides of the engine piston, means for reversing the communication between the opposing sides of the pressure responsive device and the two sides of the engine piston on each stroke of said engine piston, an indicating part actuated by said pressure responsive device, a speed responsive device and an indicating part actuated by said speed responsive device, the movements of said indicating parts being cumulative.

5. An indicator for reciprocating engines or pumps, comprising a pressure responsive device and means for communicating the pressure on each side of the engine piston to opposing sides of said pressure responsive device, whereby said pressure responsive device may assume a position corresponding to the difference in pressure on the two sides of the engine piston, means for reversing the communication between the opposing sides of the pressure responsive device and the two sides of the engine piston on each stroke of said engine piston, an indicating part actuated by said pressure responsive device, a speed responsive device, and an indicating part actuated by said speed responsive device, the movements of said indicating parts being cumulative, said indicator parts having a displaceable scale thereon, whereby it may be displaced to an extent corresponding to the value of a constant.

6. An indicator for reciprocating engines or pumps, comprising a pressure responsive device and means for communicating the pressure on each side of the engine piston to opposing sides of said pressure responsive device, whereby said pressure responsive device may assume a position corresponding to the difference in pressure on the two sides of the engine piston, means for reversing the communication between the opposing sides of the pressure-responsive device and the two sides of the engine piston on each stroke of said engine piston, an indicating part actuated by said pressure responsive device, a speed responsive device and an indicating part actuated by said speed responsive device, the movements of said indicating parts being cumulative, means causing said pressure responsive device to logarithmically actuate its indicating part, and means for causing said speed responsive device to logarithmically actuate its indicating part.

7. An indicator for reciprocating engines or pumps, comprising a pressure responsive device and means for communicating the pressures on each side of the engine piston to opposing sides of said pressure responsive device, whereby said pressure responsive device may assume a position corresponding to the difference in pressure on the two sides of the engine piston, means for reversing the communication between the opposing sides of the pressure-responsive device and the two sides of the engine piston on each stroke of said engine piston, an indicating part actuated by said pressure responsive device, a speed responsive device, and an indicating part actuated by said speed responsive device, the movements of said indicating parts being cumulative, means causing said pressure responsive device to logarithmically actuate its indicating part, means for causing said speed responsive device to logarithmically actuate its indicating part, and two logarithmic scales, one of which is adapted to be carried by one of said indicating parts, and one of which is displaceable with reference to the other, whereby it may be moved to an extent corresponding to the value of a constant, one of said scales serving to indicate the value of the factor the quantity of which it indicates, and the other of which is adapted to indicate the product of said quantity multiplied by the constant.

8. An indicator for reciprocating engines or pumps, comprising a pressure responsive device and means for communicating the pressures on each side of the engine piston to opposing sides of said pressure responsive device, whereby said pressure responsive device may assume a position corresponding to the difference in pressure on the two sides of the engine piston, means for reversing the communication between the opposing sides of the pressure-responsive device and the two sides of the engine piston on each stroke of said engine piston, an indicating part actuated by said pressure responsive device, a speed responsive device, and an indicating part actuated by said speed responsive device, the movements of said indicating parts being cumulative, means causing said pressure responsive device to logarithmically actuate its indicating part, means for causing said speed responsive device to logarithmically actuate its indicating part, and two logarithmic scales, one of which is adapted to be carried by one of said indicating parts, and one of which is displaceable with reference to the other, whereby it may be moved to an extent corresponding to the value of a constant, one of said scales serving to indicate the value of the factor, the quantity of which it indicates, and the other of which is adapted to indicate the product of said quantity multiplied by the constant, and said two indicating parts in conjunction with said scales being adapted to indicate the product of two factors, and of two factors and the constant respectively.

9. An indicator for reciprocating engines or pumps, comprising a plurality of pressure responsive devices adapted to be connected with a plurality of engine cylinders, as for example, different cylinders of a multiple-expansion engine, and means for communicating the pressures on each side of each engine piston to opposing sides of its corresponding pressure responsive device, whereby said pressure responsive devices may each assume positions corresponding to the difference in pressure on the two sides of each of the engine pistons, means for reversing the communication between the opposing sides of the pressure-responsive device and the two sides of the engine piston on each stroke of said engine piston, and an indicating part actuated by each of said pressure responsive devices.

10. An indicator for reciprocating engines or pumps, comprising a plurality of pressure responsive devices adapted to be connected with a plurality of engine cylinders, as for example, different cylinders of a compound engine, and means for communicating the pressures on each side of each engine piston to opposing sides of its corresponding pressure responsive device, whereby said pressure responsive devices may each assume positions corresponding to the difference in pressure on the two sides of each of the engine pistons, means for reversing the communication between the opposing sides of the pressure-responsive device and the two sides of the engine piston on each stroke of said engine piston, and an indicating part actuated by each of said pressure responsive devices, said indicating means comprising concentric shafts, whereby the indicating parts may move around a common center.

11. An indicator for reciprocating engines or pumps, comprising a plurality of pressure responsive devices adapted to be connected with a plurality of engine cylinders, as for example, different cylinders of a multiple expansion engine, and means for communicating the pressures on each side of each engine piston to opposing sides of its pressure responsive device, whereby said pressure responsive devices may each assume positions corresponding to the difference in pressure on the two sides of each of the engine cylinders, means reversing the communication between the opposing sides of the pressure responsive devices and the two sides of each of the engine pistons on each stroke of said engine pistons, means for damping the movements of said pressure responsive devices, and an indicating part actuated by each of said pressure responsive devices.

In witness whereof, I have hereunto signed my name.

EDVIN HARALD MORTSELL.